United States Patent [19]
Nakamura et al.

[11] Patent Number: 5,369,746
[45] Date of Patent: Nov. 29, 1994

[54] INTERPROCESSOR DATA TRANSFERRING SYSTEM AND METHOD

[75] Inventors: Takashi Nakamura, Hiratsuka; Kunitaka Ozawa, Isehara; Tsuneaki Kadosawa, Ninomiyamachi; Eiji Koga, Hadano; Hitoshi Watanabe, Yokohama, all of Japan

[73] Assignee: Canon Kabushiki Kaisha, Tokyo, Japan

[21] Appl. No.: 126,029

[22] Filed: Sep. 24, 1993

Related U.S. Application Data

[63] Continuation of Ser. No. 772,248, Oct. 7, 1991, abandoned.

[30] Foreign Application Priority Data

Oct. 8, 1990 [JP] Japan .................................. 2-271218

[51] Int. Cl.⁵ ........................................... G06F 13/00
[52] U.S. Cl. ................................................. 395/200
[58] Field of Search ............... 370/94.1; 395/200, 325, 395/425

[56] References Cited

U.S. PATENT DOCUMENTS

| | | | |
|---|---|---|---|
| 3,787,891 | 1/1974 | Moore et al. | 395/200 |
| 4,750,109 | 6/1988 | Kita | 364/200 |

FOREIGN PATENT DOCUMENTS

| | | |
|---|---|---|
| 0193933 | 9/1986 | European Pat. Off. |
| 0216253 | 4/1987 | European Pat. Off. |
| 0313668 | 5/1989 | European Pat. Off. |
| 0345738 | 12/1989 | European Pat. Off. |

*Primary Examiner*—Robert L. Richardson
*Attorney, Agent, or Firm*—Fitzpatrick, Cella, Harper & Scinto

[57] ABSTRACT

An information processor including a plurality of processors interconnected by communication means, each processor having a memory storing a program and data, an instruction interpretation section for interpreting instructions in the program, and an instruction execution section for executing the result of interpretation. Each processor referring to the address of source data or destination data indicated by an operand of a data transfer instruction, and determining which of the plurality of processors the source data or destination data pertain.

11 Claims, 11 Drawing Sheets

DIRECT MODE WITH PROCESSOR ID

FIG. 6(b)

DIRECT MODE WITHOUT PROCESSOR ID

FIG. 6(c)

IMMEDIATE MODE

PROCESSOR A    PROCESSOR B    PROCESSOR C

INTERPROCESSOR DATA TRANSFERRING SYSTEM AND METHOD

This application is a continuation of application Ser. No. 07/772,248 filed Oct. 7, 1991, which is now abandoned.

BACKGROUND OF THE INVENTION

1. Field of the Invention

This invention generally relates to information processing apparatuses and, more particularly, to an information processing apparatus which includes a plurality of processors and between which data is transferred.

2. Description of the Prior Art

When one processor does not suffice for large-scale equipment control in terms of processing capacity, a multiprocessor system in which a plurality of processors are connected to each other is employed. A multiprocessor system is also employed in a case where the scale of equipment to be controlled by one processor is so large that it is difficult to connect signal lines from a plurality of sensors and actuators to the processor. To control such equipment, so that units of the equipment cooperate suitably with each other, it is often necessary to interconnect processors into a multiprocessor system so that data can be exchanged between the processors. For example, in a multiprocessor system consisting of a processor A and a processor B, a value read from a sensor by the processor A is used by the processor B.

Multiprocessor systems are generally grouped into two types one wherein a bus is shared, and the other wherein the bus is not shared. Data transmission in the former is easier in comparison with that in the latter. Among the former type of multiprocessor systems, i.e., systems in which a bus is shared, a multiprocessor system having a shared memory enables particularly easy data transfer between processors, as described below. For example, in the case of a multiprocessor system consisting of two processors A and B and having a shared memory M1 which is readable/writable from each of the processors A and B, when data is transferred from processor A to processor B, the operation may be such that processor A writes the data to be transferred in the memory M1 and processor B then reads out the data written by the processor A from the memory M1.

However, as is well known, a bus cannot be shared between a plurality of processors placed at a substantially large distance from each other. A bus line carries a signal having a frequency of several MHz to several tens of MHz, and the length of the bus line is generally limited to several tens of centimeters. Accordingly, multiprocessor systems in which the bus is not shared are ordinarily used as control systems for enabling the cooperation of controlled objects spatially remote from each other. There are various means for effecting communication between processors without using a shared bus. For example, the RS-232C interface is often used as a low-speed simple means of this kind, and Ethernet is used as a means for enabling high-speed communication and providing a function of preventing occurrence of contention between processors.

For example, in a multiprocessor system in which a plurality of microcomputers are connected through RS-232C interfaces, hardware for sending data of one or two types from one processor to another processor can be realized by using a serial communication control LSI device, e.g., 8251, a product from Intel Corp., or Z80SIO, a product from Zilog Inc.

However, it is necessary for the programmer to write a step for calling a sub program for data transfer between one processor and some other processors each time a need for using data on other processors arises. Moreover, if in the process of developing a system, a processor A to which certain data X pertains is changed to a processor B, rewriting all the program steps using data X is required and the programmer must do this troublesome operation.

SUMMARY OF THE INVENTION.

An object of the present invention is to provide a means for realizing data transfer between processors free from such troublesome operation.

To achieve this object, according to one aspect of the present invention, there is provided an information processing apparatus in which a plurality of processors are interconnected by communication means, each processor having a memory storing a program and data, an instruction interpretation section for interpreting instructions in the program, and an instruction execution section for executing the result of interpretation, each processor also having processor discrimination means for referring to information on the address of source data or destination data indicated by an operand of a data transfer instruction, and for determining to which of the processors the source data or destination data pertain.

According to another aspect of the present invention, there is provided an information processing apparatus in which a plurality of processors are interconnected by communication means, each processor having a memory storing a program and data, an instruction interpretation section for interpreting instructions in the program, and an instruction execution section for executing the result of interpretation. The operation of each processor including the steps of referring to the address of source data or destination data indicated by an operand of a data transfer instruction, and determining to which of the plurality of processors the source data or destination data pertain.

According to still another aspect of the present invention, there is provided an information processing apparatus having a memory connected to communication means and storing a program and data, an instruction interpretation section for interpreting instructions in the program, and an instruction execution section for executing the result of interpretation, the apparatus comprising:

discrimination means for referring to information on the address of source data or destination data indicated by an operand of a data transfer instruction, and for determining to which information processor the source data or destination data pertain; and transfer means for transferring data by referring to the address of the source data or destination data indicated by the operand of the data transfer instruction.

According to a further aspect of the present invention there is provided an information processing system comprising processors interconnected by communication means each processor having a memory storing a program and data, an instruction interpretation section for interpreting instructions in the program, and an instruction execution section for executing the result of interpretation, each of the processors including:

processor discrimination means for referring to information on the address of source data or destination data indicated by an operand of a data transfer instruction, and for determining to which of the processors the source data or destination data pertain; and means for referring to the information on the address of the source data or destination data indicated by the operand of the data transfer instruction, and for transferring data to the corresponding one of the processors.

According to still a further aspect of the present invention, there is provided an information processing method using an information processing system in which a plurality of processors each having a memory storing a program and data, an instruction interpretation section for interpreting instructions in the program, and an instruction execution section for executing the result of interpretation are interconnected by communication means, the method comprising the steps of:

referring to the address of source data or destination data indicated by an operand of a data transfer instruction with respect to one of the processors; and determining to which of the plurality of processors the source data or destination data pertain.

According to still a further aspect of the present invention, there is provided an information processing method using an information processing apparatus in which a plurality of processors are interconnected by communication means, each of the processors having a memory storing a program and data, an instruction interpretation section for interpreting instructions in the program, and an instruction execution section for executing the result of interpretation, the method comprising the steps of:

referring to the address of source data or destination data indicated by an operand of a data transfer instruction;

determining to which .of the plurality of processors source data or destination data pertain; and transferring data by referring to the address of the source data or destination data indicated by the operand of the data transfer instruction.

These and other objects and features of the present invention will be apparent from the following detailed description of the invention.

DESCRIPTION OF THE PREFERRED EMBODIMENT

Embodiments of the present invention will be described below with reference to the accompanying drawings.

Figure 2:
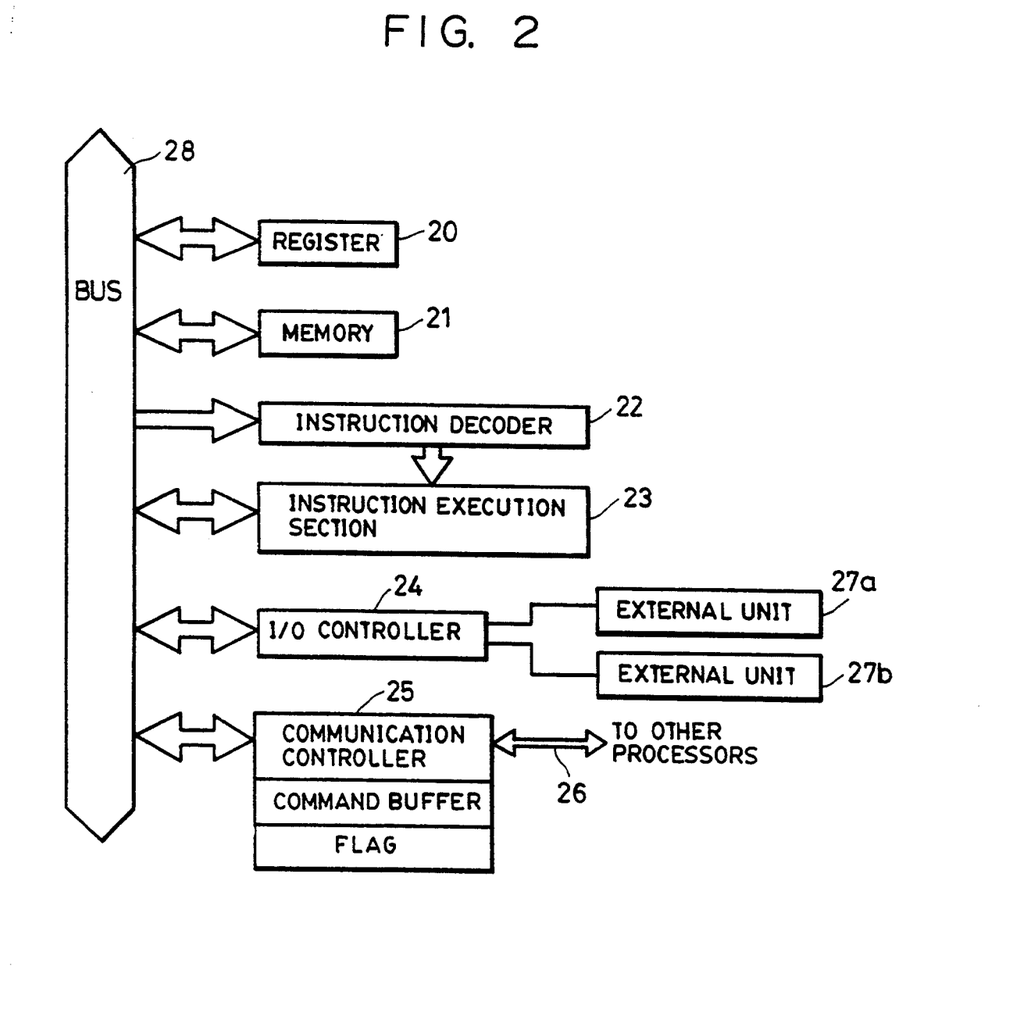
FIG. 2 is a block diagram of one of the processors constituting the multiprocessor system in accordance with the present invention.
Figure 3:
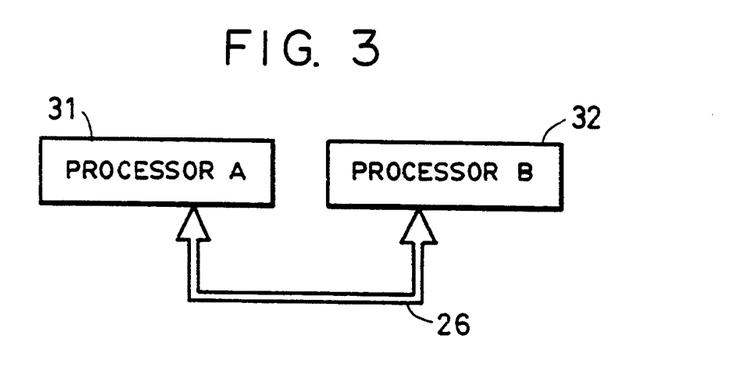
FIG. 3 is a block diagram of an example of the multiprocessor system constituted by two processors in accordance with the present invention.

FIG. 2 is a block diagram of one processor constituting a multiprocessor system in accordance with an embodiment of the present invention, and FIG. 3 is a diagram of an example of the multiprocessor system constituted by a processor A and a processor B connected by a communication line 26 and forming a non-shared bus communication system. As shown in FIG. 2, each processor has a register 20 for temporarily storing data or the result of calculation, and a memory 21 in which a program (including procedures shown in FIGS. 10(a) and 10(b)) or data is stored. The program includes also a user program and an operating system. The operating system controls the execution of the user program. The program stored in the memory 21 is sent to an instruction decoder 22 through a bus 28 to be interpreted. The result of interpretation is sent to an instruction execution section 23 to be executed. The result of the execution through the bus 28 is one of the following operations or a combination of some of them:

1) referring to the values of data stored in the register 20 or the memory 21;
2) changing the values of data stored in the register 20 or the memory 21;
3) receiving data from an external unit 27a or 27b through an I/O controller 24 or a communication controller 25;
4) sending data to the external unit 27a or 27b through the I/O controller 24 or the communication controller 25;
5) receiving a command from the other processor through the communication controller 25; and
6) sending a command to the other processor through the communication controller 25.

The external units 27a and 27b may be a keyboard and a display.

Each of the instruction decoder 22 and the instruction execution section 23 is realized by using a matrix, AND-/OR logic, wired logic or a microprogram. The communication controller 25 can be constituted of a serial communication control LSI device on the market and is provided with a command buffer and a flag.

Figure 4:
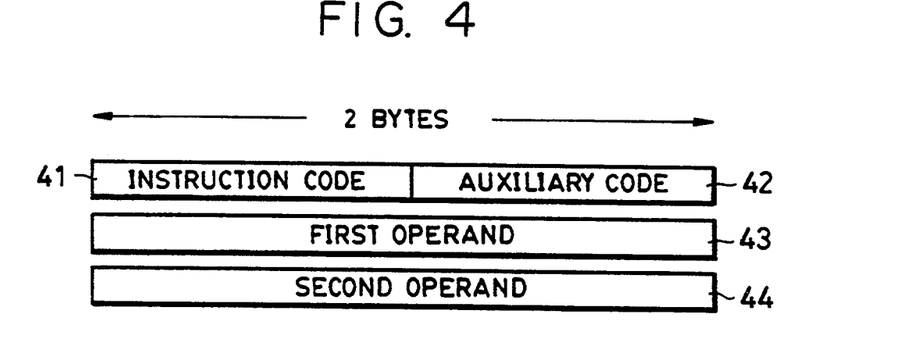
FIG. 4 is a diagram of the form for an instruction executed in each processor.
Figure 5:
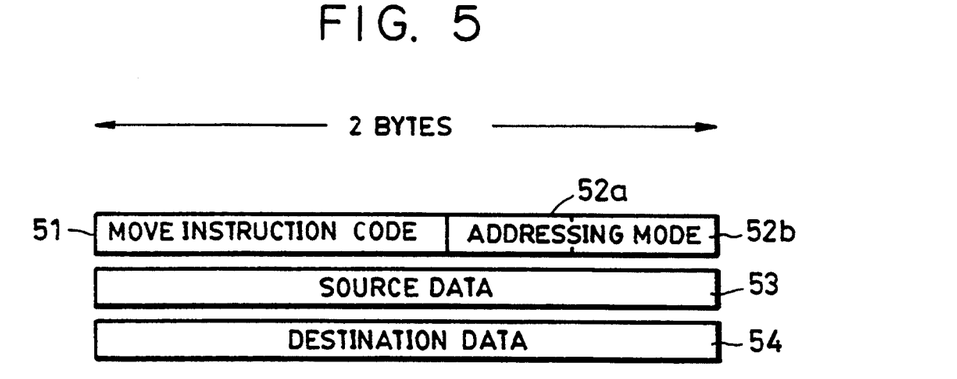
FIG. 5 is a diagram of the form for a move instruction which is a data transfer instruction.

The form of instructions executed by the processor A and B is shown in FIG. 4. Each instruction has an instruction code 41 indicating the kind of the instruction, an auxiliary code 42 for assisting in sorting with the instruction code 41 and used to indicate, for example, the form of the operands. The rest of each instruction, i.e., the third and other subsequent bytes are operands which are used to indicate the addresses of processing object data and other values. Examples of the operands shown in FIG. 4 are a first operand 43 and a second operand 44 each having a length of 2 bytes. However, the number of operands and the length of each operand vary according to the kind of instruction and are determined by the instruction code 41 and the auxiliary code 42. A Move instruction which is data transfer instruction has a form such as that shown in FIG. 5. In the Move instruction, the auxiliary code represents addressing modes 52a and 52b, the first operand represents source data 53 on a transfer source, and the second operand represents destination data 54 on a transfer destination. The addressing mode 52a indicates the form in which the source data 53 is expressed, and the addressing mode 52b indicates the form in which the destination data 54 is expressed. The examples of the source data 53 and the destination data 54 have a length of 2 bytes. However, the lengths of these categories of data vary according to the values of the addressing modes 52a and 52b.

Figure 6A:
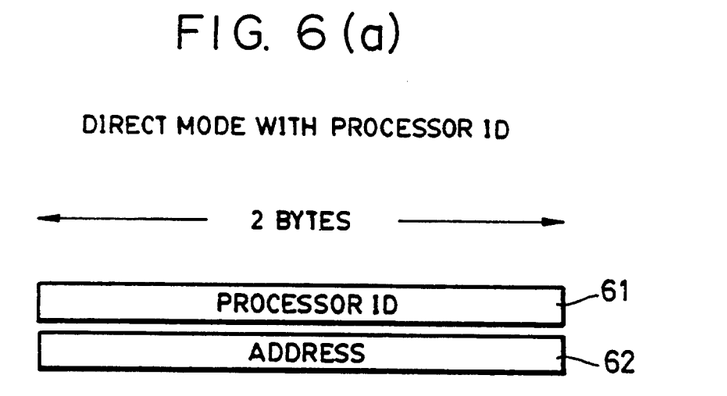
FIGS. 6(a) to 6(c) are diagrams of kinds of operands for the move instruction.
Figure 6B:
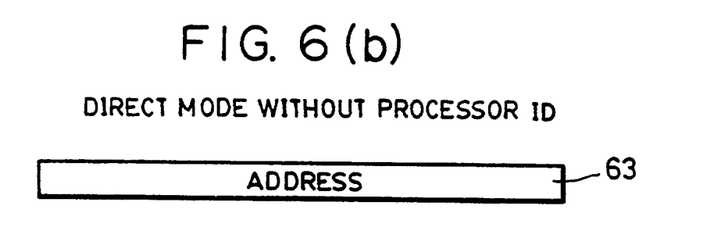
Figure 6C:
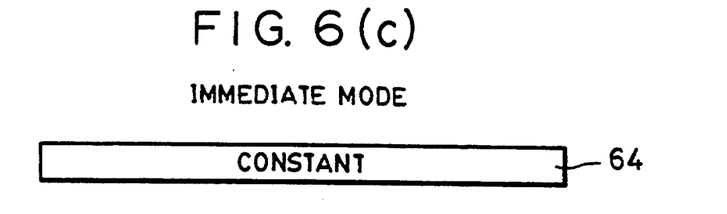

FIGS. 6(a) to 6(c) show three kinds of data expression forms. FIG. 6(a) shows a data expression form in a direct mode using a processor ID for indicating which processor a variable exists on. FIG. 6(b) shows a data expression from in a direct mode using no processor ID, which is considered to indicate data on the processor receiving the corresponding instruction. FIG. 6(c) is a data expression form in an immediate mode, which has a value placed on operand that is directly used as transfer object data. The mode shown in FIG. 6(a) is not used in the prior art, when the modes shown in FIGS. 6(b) and 6(c) are ordinarily used as addressing modes of conventional computers. Needless to say, the immediate mode cannot be designated as a form for destination data on a transfer destination.

Figure 1:
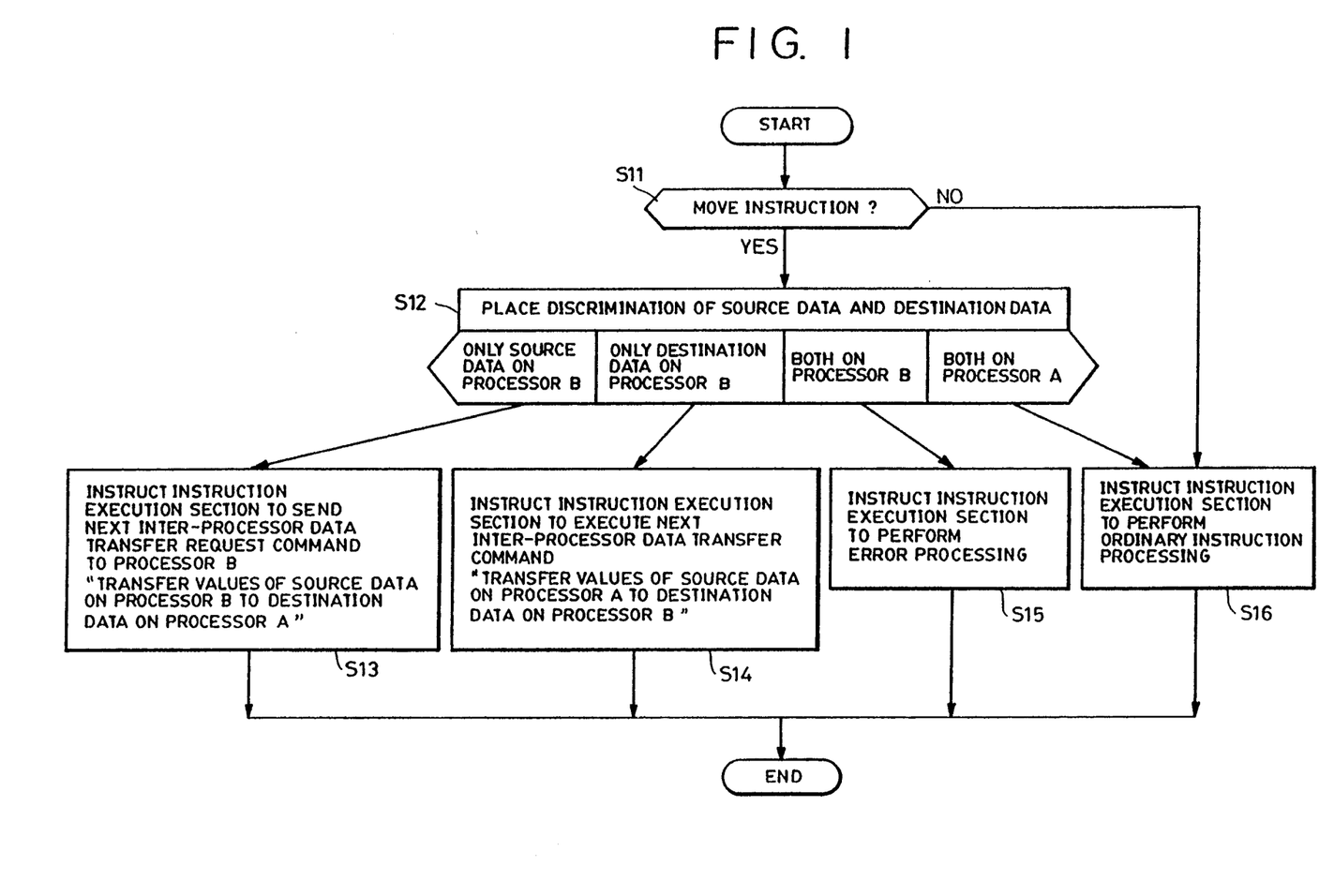
FIG. 1 is a flow chart of the operation of an instruction decoder of one of the processors constituting a multiprocessor system in accordance with the present invention.

Next, a process of interpreting a Move instruction, i.e., a data transfer instruction, with the instruction decoder 22 will be described with reference to FIG. 1 which is a flow chart of the operation of the instruction decoder 22. It is assumed that, at the start of the operation shown in FIG. 1, the instruction code 41, the auxiliary code 42, the first operand 43 and the second operand 44 in the instruction have already been read from the memory 21 and input into an instruction buffer (not shown) provided in the instruction decoder. The following description reads with respect to the operation of the instruction decoder 22 on the processor A unless otherwise noted.
Step S11

Determination is made by the instruction decoder 22 as to whether the instruction fetched into the instruction buffer is a Move instruction. If NO, information for branching to step S16 is output.
Step S12

If the instruction fetched into the instruction buffer is a Move instruction, addressing modes 52a and 52b are referred to and the instruction decoder operates to examine whether source data 53 and destination data 54 exist on processor A or processor B. However, in the case of the immediate mode, the data is considered to exist on processor A. In the case of the direct mode using no processor ID, the data is considered to exist on the same processor as that receiving the instruction, i.e., processor A.
Step S13

If the source data is on the processor B, information for branching to step S13 is output. The instruction decoder 22 instructs the instruction execution section 23 to send a data transfer request command shown below to the processor B, thereby terminating the process.

"Transfer the values of source data on the processor B to destination data on the processor A."
Step S14

If the destination data is on the processor B, information for branching to step S14 is output. The instruction decoder 22 instructs the instruction execution section 23 to execute an inter-processor data transfer command shown below, thereby terminating the process.

"Transfer the values of source data on the processor A to destination data on the processor B."
Step S15

If both the source data and the destination data are on the other processor, i.e., processor B, the instruction decoder 22 outputs information to the instruction execution section 23 to perform error processing, since the multiprocessor system of this embodiment is not designed to cope with such a situation. The process is then terminated.
Step S16

If both the source data and the destination data are on the present processor, i.e., processor A, the instruction decoder 22 instructs the instruction execution section 23 to perform ordinary processing in which there is no need to consider the other processor.

The instruction execution section 23 sends an inter-processor communication command through the communication controller 25 in accordance with the instruction from the instruction decoder 22. The operation of the instruction decoder on the processor A is thus performed. The above procedure, which may be realized by using a decoder as described above, may also be realized as a program control. In such a case, the procedure is stored in the memory 21 and executed by the processor. The instruction decoder on the processor B also checks the existence of data and requests for data transfer in the same manner.

Figure 7:
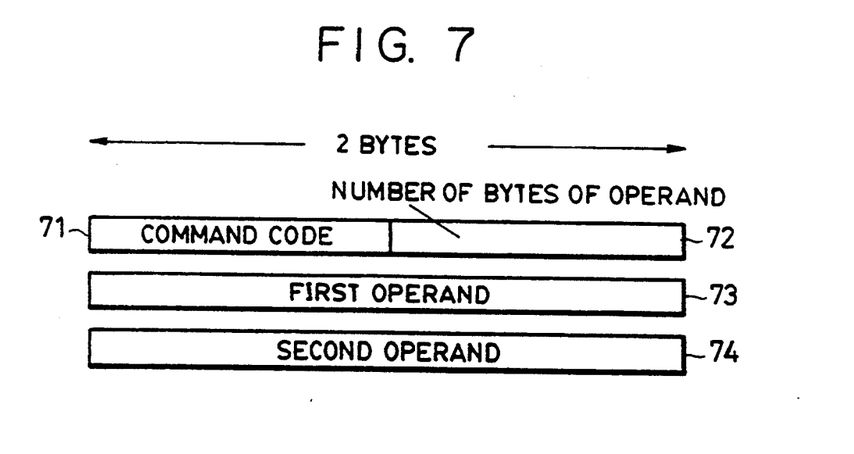
FIG. 7 is a diagram of the form for inter-processor communication commands exchanged between the processors.
Figure 8:
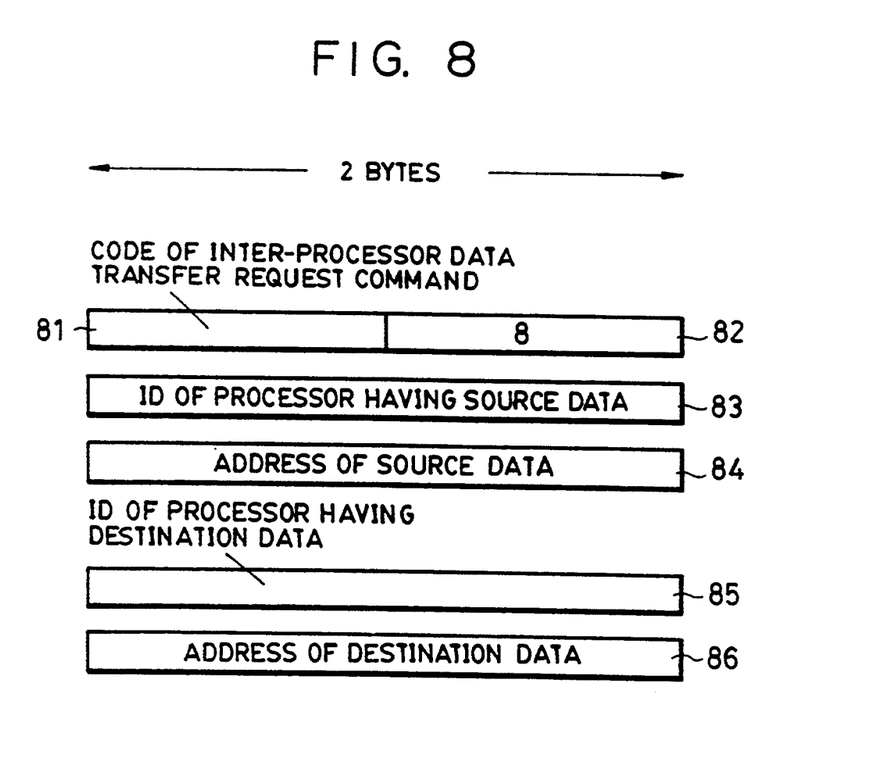
FIG. 8 is a diagram of the form for an inter-processor data transfer request command among the inter-processor communication commands.

The form of inter-processor communication commands exchanged between the processors will be described below. The processors A and B exchange inter-processor communication commands in a form such as that shown in FIG. 7. Each command has a command code 71 indicating the kind of the command, and number 72 representing the number of bytes of operands provided on the third and other subsequent bytes. The number of operands and the length of each operand vary with respect to commands. FIG. 8 shows the form of the inter-processor data transfer request command used in step S13, and FIG. 9 shows the form of the inter-processor data transfer command used in step S14.

The form shown in FIG. 8 includes a code 81 for the inter-processor data transfer request command and the number 82 of bytes of operands provided on the third and other subsequent bytes. In the inter-processor data transfer request command, the number of bytes of operands is 8. A first operand has a length of 4 bytes and consists of a processor ID 83 for the processor having source data and an address 84 of the source data. A second operand has a length of 4 bytes and consists of a processor ID 85 of the processor having destination data and an address 86 of the destination data. In the case of the inter-processor data transfer request command sent from the processor A to the processor B, source data exists on the processor B while destination data exists on the processor A. Accordingly, the processor ID 83 of the processor having source data is the processor ID of the processor B, and the processor ID 85 of the processor having destination data is the processor ID of the processor A.

Figure 9:
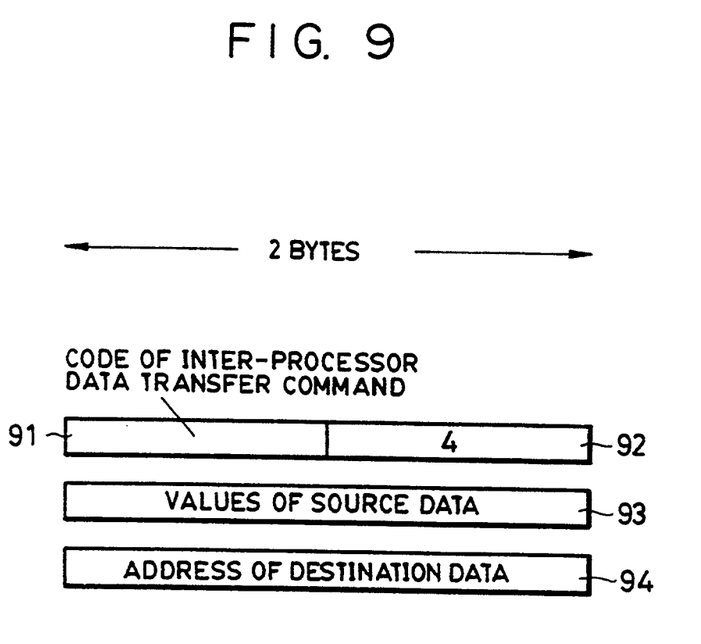
FIG. 9 is a diagram of the form for an inter-processor data transfer command among the inter-processor communication commands.

The form shown in FIG. 9 includes a code 91 of the inter-processor data transfer command and the number 92 of bytes of operands provided on the third and other subsequent bytes. In the inter-processor data transfer command, the number of bytes of operands is 4. A first operand has a length of 2 bytes and consists of values 93 of source data. A second operand has a length of 2 bytes and consists of an address 94 of destination data.

The procedure of inter-processor communication command processing will be described below. The inter-processor communication command processing is conduced based on a command reception interruption process shown in FIG. 10(a) and an inter-processor communication command processing section of the operating system shown in FIG. 10(b). When the processors A and B receive an inter-processor communication command through the communication line 26, they start executing the command reception interruption processing program shown in FIG. 10(a) by a command reception interruption effected by the communication controller 25. The procedure of the command reception interruption processing program is as described below.

Figure 10A:
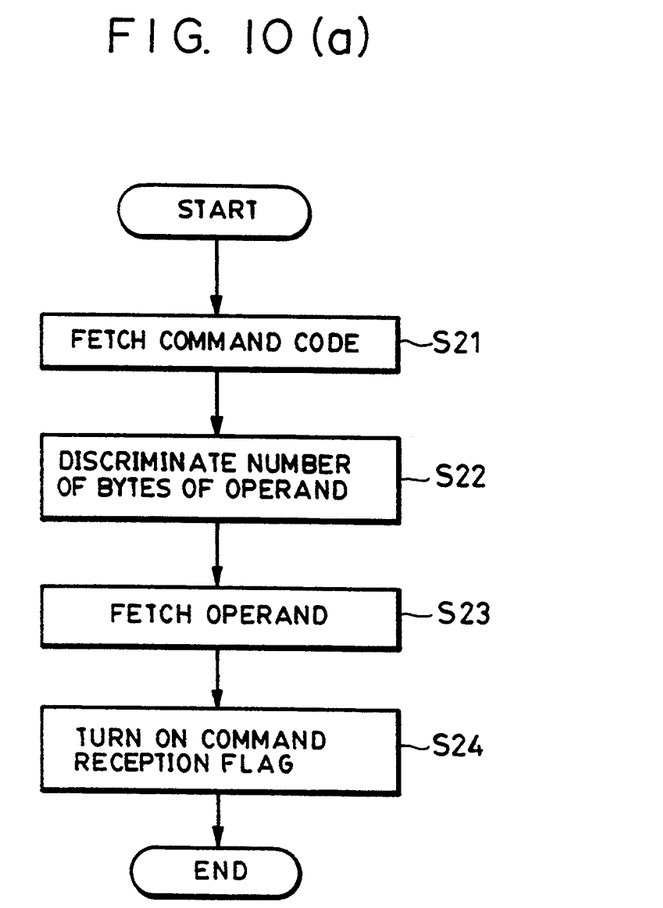
FIG. 10(a) is a flow chart of the operation of a command reception interruption processing program started by command reception interruption.

In step S21, command code 91 is fetched into the command buffer (not shown).

In step S22, the number 92 of bytes of operands is fetched in the command buffer and the processor A checks the command buffer.

In step S23, operands having the number of bytes detected in step S22 are fetched.

In step S24, the command reception flag (not shown) is turned on and the process is terminated. When the command reception flag is on, the command reception interruption program inhibits reception of inter-processor communication commands.

Figure 10B:
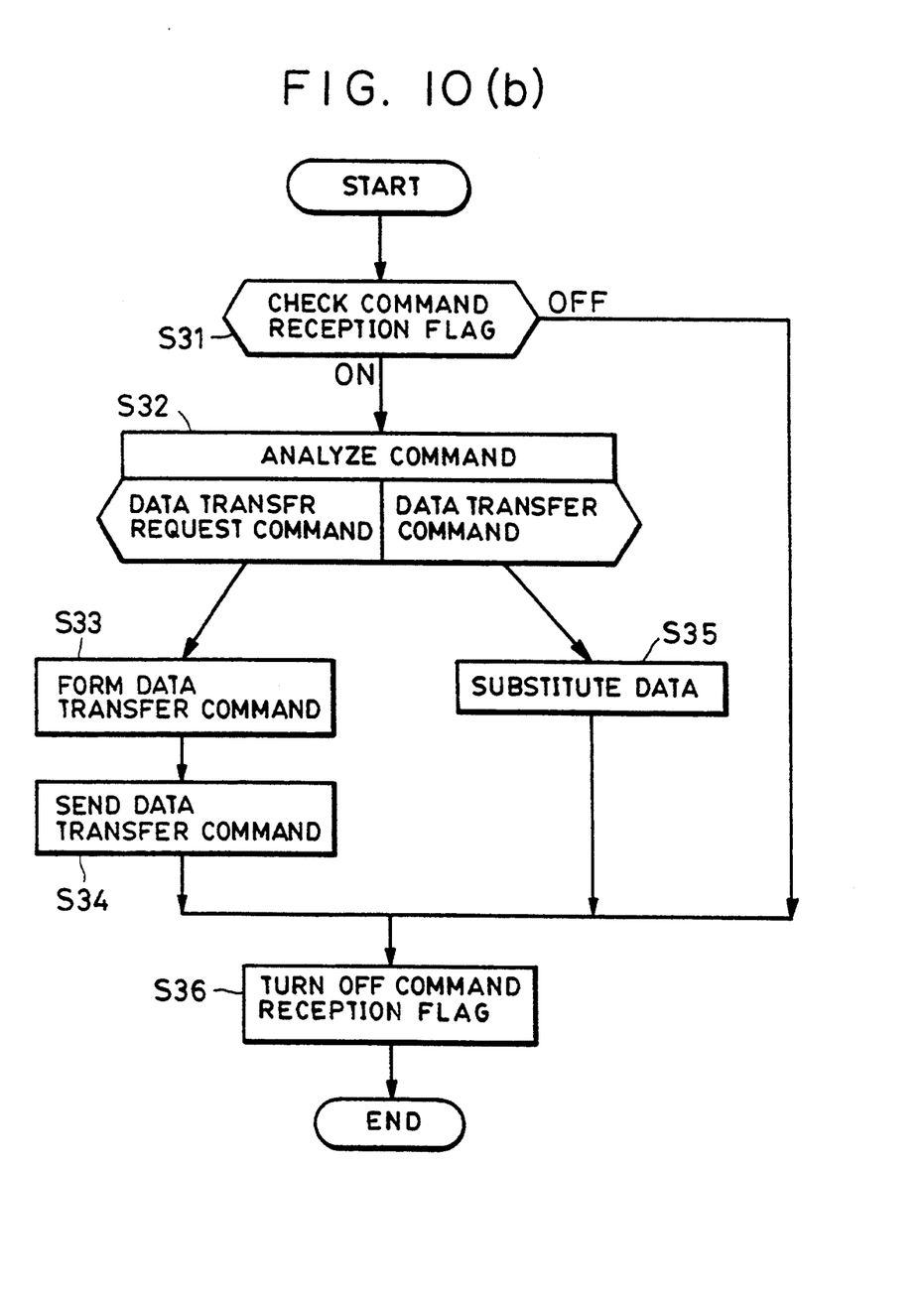
FIG. 10(b) is a flow chart of the operation of a command processing section for processing each inter-processor communication command in the operating system.

The inter-processor command processing section of the operating system shown in FIG. 10(b) conducts actual processing when the command reception flag is turned on by the command reception interruption processing. The procedure of the inter-processor command processing will be described below.

In step S31, the command reception flag is checked. If it is OFF, the process branches off to step S36. If the command reception flag is ON, the process proceeds to step S32.

In step S32, the command code is read out of the command buffer and is analyzed. In the case of a data transfer request command, the process branches to step S33. In the case of a data transfer command, the process branches to step S35.

In step S33, the processor ID of the processor having source data, the address of the source data, the processor ID of the processor having destination data, and the address of the destination data are read out as operands from the command reception buffer. Then, an inter-processor data transfer instruction in the form shown in FIG. 9 is formed. To create the values 93 of the source data, data in the address indicated by the address 84 of the source data which is one of the operands of the inter-processor data transfer request command is used. To create the address 94 of the destination data, the address 86 of the destination data which is one of the operands of the inter-processor data transfer request command is used.

In step S34, the inter-processor data transfer command formed in step S33 is sent to the processor having the destination data.

In step S35, in the case where the command is a data transfer command, the values of source data and the address of destination data are read out of the command reception buffer, and a data substitution operation for substituting the values of the source data in the destination data is performed.

In step S36, the command reception flag is turned off to prepare for the next command reception, and the process is terminated.

Figure 11A:
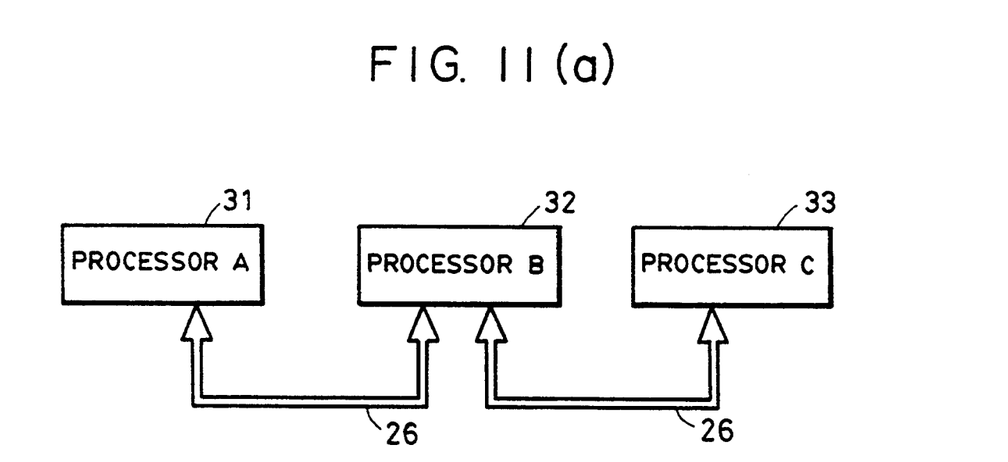
FIGS. 11(a) to 11(b) are block diagrams of multiprocessor systems each constituted of three processors.
Figure 11B:
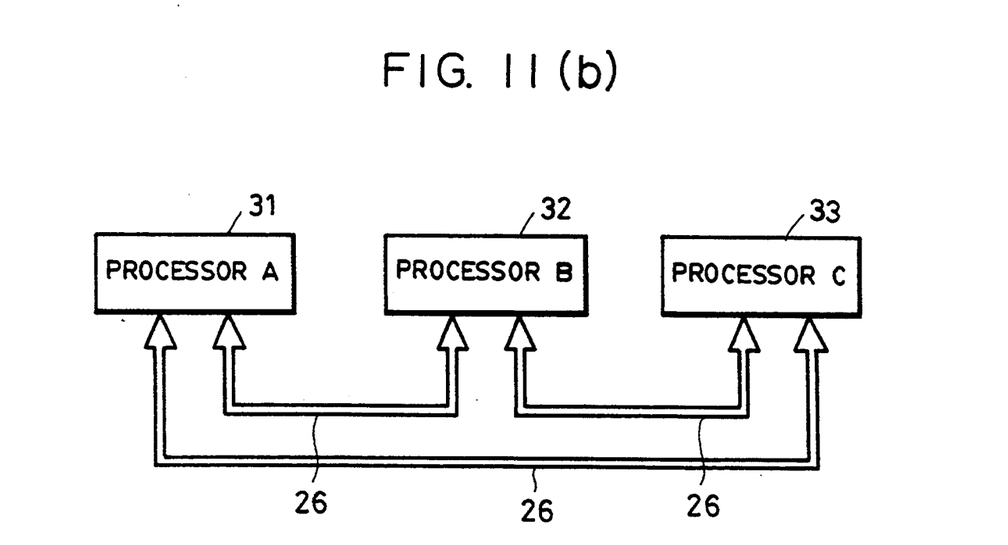

According to the present invention, there is no limit to the number of processors, although the above-described embodiment have only two processors. The present invention can easily be applied to a multiprocessor system having three or more processors interconnected by communication lines 26 as shown in FIG. 11(a) or 11(b).

In the above-described embodiment, there is a limitation such that source data and destination data appearing in operands of a data transfer instruction must not exist simultaneously on the other processor. However, in a system wherein a program written by a programmer is compiled into execution codes executable by the processors, a method, described below, enables the programmer to regard the system as free from this limitation.

When a program written by the programmer is compiled into executable execution codes and stored in a memory, a conversion, e.g., the one described below, may be effected.

It is assumed that X and Y are variables on processor B, and that a program such that X=Y on processor A ... statement 1 is written. The compiler converts the statement 1 into the following statement:

C=Y ... statement 2

X=C ... statement 3 where C is a variable set on the processor A by the compiler. By this conversion, source data and destination data do not exist simultaneously on the other processor in terms of data transfer instruction execution codes, and the programmer can therefore regard the system as free from the above-mentioned limitation.

Figure 12:
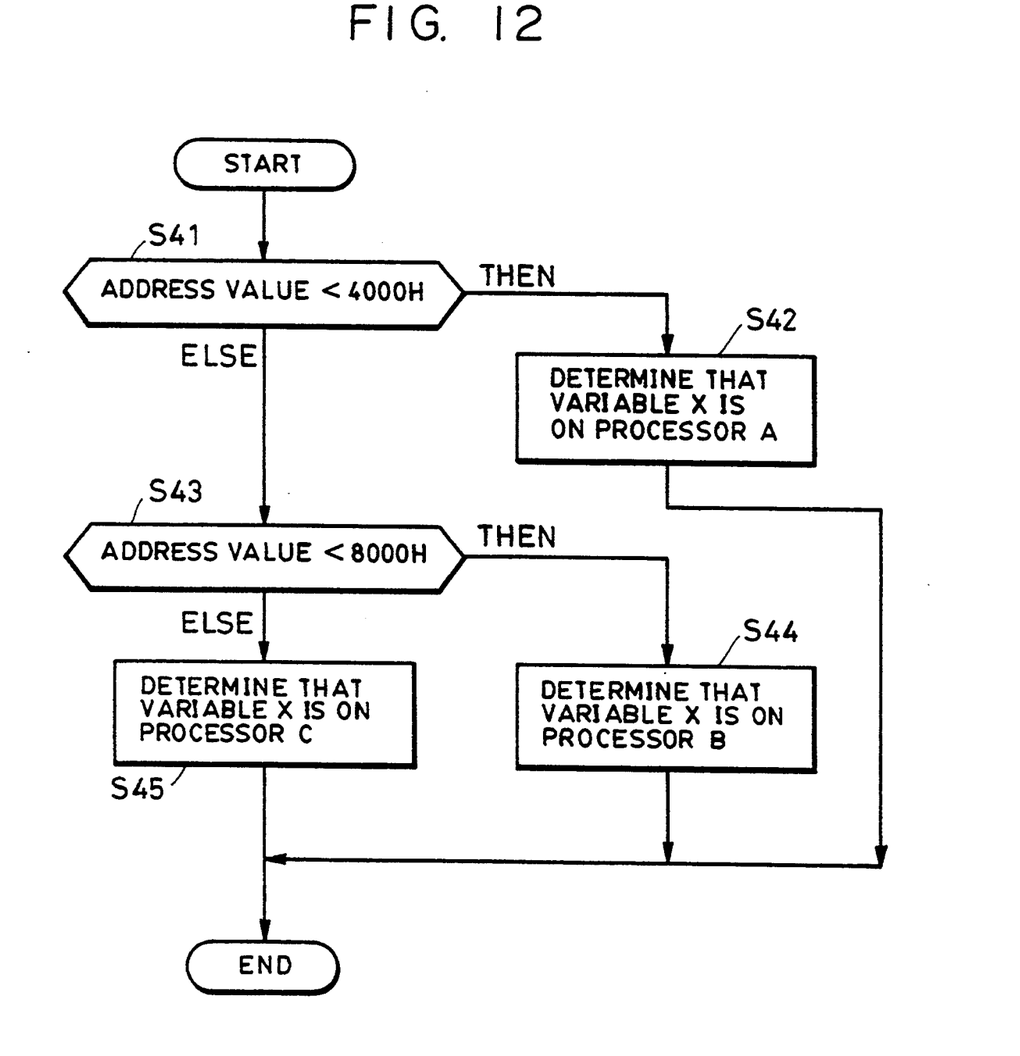
FIG. 12 is a flow chart of the operation of a processor discrimination means arranged to enable discrimination of processors requiring no processor ID.
Figure 13:
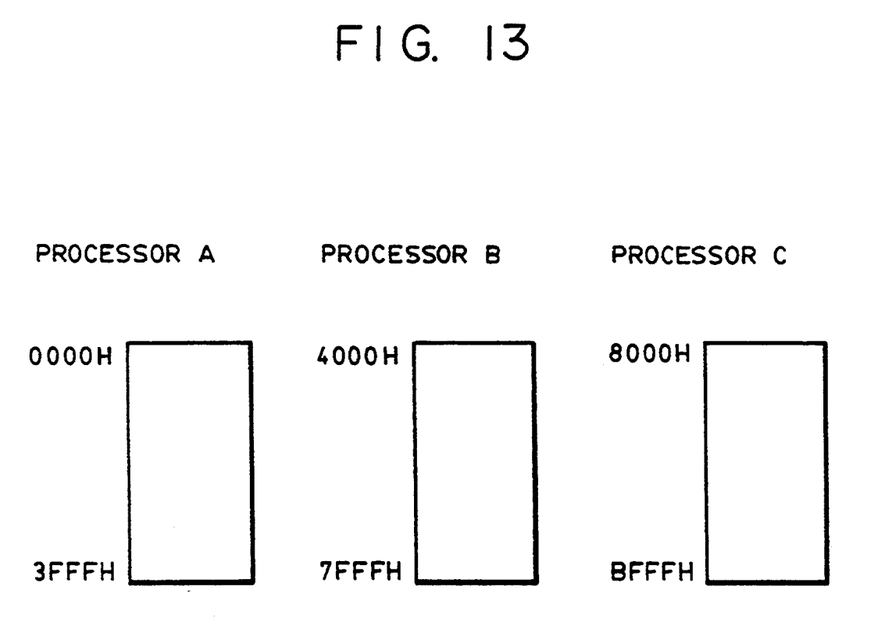
FIG. 13 is a diagram of the address-space arrangement of memories of processors discriminated by the processor discrimination means shown in FIG. 12.

In the above-described embodiment, processor IDs designating the processors exist in operands of a data transfer instruction. However, processors can be discriminated by a method using no processor ID in which addresses of the memory are arranged so as to avoid overlapping with respect to other processors, and in which a processor discrimination procedure for conducting operations as shown in FIG. 12 is stored in memory 21 and is executed by the processors. The operation of the processor discrimination means shown in FIG. 12 will be described below, which is, in this case, provided in a multiprocessor system having three processors A, B, and C having memories arranged in address space as shown in FIG. 13. It is assumed here that before the execution of the operation of the processor discrimination means shown in FIG. 12, operands of a data transfer instruction have been fetched and the addresses of source data and destination data have been separated, so that the address value can be compared with other data items. It is also assumed that the address of a variable X is indicated by an operand in this case.

In step 41, the address value is checked as to whether it is smaller than 4000H. If the address value is smaller than 4000H, the process branches to step S42. If the address value is equal to or greater than 4000H, the process branches to step S43.

In step S42, it is determined whether variable X exists on processor A.

In step S43, the address value is checked as to whether it is smaller than 8000H. If the address value is smaller than 8000H, the process branches to step S44. If the address value is equal to or greater than 8000H, the process branches to step S45.

In step S44, it is determined whether variable X exists on processor B.

In step S45, it is determined whether variable X exists on processor C.

By this processing, processors A to C can be discriminated even if there is no processor ID in the operands.

According to the present invention, as described above, it is not necessary for the programmer to write an interprocessor data transfer instruction for a program when the processing of this program requires data provided on a processor other than the processor operated by this program, thus improving program development efficiency.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing system including a plurality of information processing apparatuses interconnected by communication means, each of said plurality of information processing apparatuses comprising:

discrimination means for referring to information on an address of source data or destination data indicated by an operand of a data transfer instruction to be processed in each of said plurality of information processing apparatuses, and discriminating as to which information processor the source data or destination data pertain; and transfer means for transferring a data transfer request instruction through said communication means in a desired information processing apparatus of said plurality of information processing apparatuses by referring to the address of the source data or destination data indicated by the operand of the data transfer instruction based on the discrimination result of said discrimination means.

2. An information processing apparatus according to claim 1, wherein said transfer means includes means for transferring data through said communication means.

3. An information processing apparatus according to claim 1, wherein said discrimination means includes means for discriminating addressing modes.

4. An information processing method using a plurality of information processing apparatuses interconnected by communication means, said method comprising the steps of:

determining as to which information processor the source data or destination data pertain by referring to address information of a source data or destination data indicated by an operand of a data transfer instruction to be processed in each of the plurality of information processing apparatuses; and transferring a transfer request instruction through the communication means in a desired information processing apparatus of each of the plurality of information processing apparatuses by referring to the address of the source data or destination data indicated by the operand of the data transfer instruction to be processed in each of said plurality of information processing apparatuses.

5. An information processing method according to claim 4, wherein said determining step discriminates addressing modes.

6. An information processing method according to claim 4, wherein said determining step decodes and discriminates addressing modes.

7. An information processing method according to claim 4, wherein said transferring step uses serial communication.

8. An information processing method using an information processing system in which a plurality of processors each having a memory storing a program and data, an instruction interpretation section for interpreting instructions in the program, and an instruction execution section for executing the result of interpretation are interconnected by communication means, said method comprising the steps of:

referring to the address of source data or destination data indicated by an operand of a data transfer instruction with respect to one of said processors; and determining which of said plurality of processors the source data or destination data pertain.

9. An information processing method according to claim 8, wherein said determination step includes the step of discriminating addressing modes.

10. An information processing system including plurality of processors interconnected by communication means, said system comprising:

discrimination means for referring to an address of source data or destination data indicated by an operand of a data transfer instruction to be processed in each of said plurality of processors, and discriminating as to which of said plurality of processors the source data or destination data pertain; and transfer means for transferring data transfer request command through said communication means in a desired one of said plurality of processors by referring to the address of the source data or destination data indicated by the operand of the data transfer instruction based on the discrimination result of said discrimination means.

11. An information processing system according to claim 10, wherein said discrimination means discriminates addressing modes.

* * * * *

UNITED STATES PATENT AND TRADEMARK OFFICE
CERTIFICATE OF CORRECTION

PATENT NO.  : 5,369,746
DATED       : November 29, 1994
INVENTOR(S) : TAKASHI NAKAMURA, ET AL.

It is certified that error appears in the above-identified patent and that said Letters Patent is hereby corrected as shown below:

[57] ABSTRACT

Line 10, "which" should read --to which--.

COLUMN 3

Line 37, ".of" should read --of--; and

Line 38, "source" should read --the source--.

COLUMN 10

Line 38, "which" should read --to which--;

Line 43, "including" should read --including a--; and

Line 54, "data" should read --a data--.

Signed and Sealed this

Thirtieth Day of May, 1995

Attest:

BRUCE LEHMAN

*Attesting Officer*      *Commissioner of Patents and Trademarks*